United States Patent [19]
De Sisto et al.

[11] 4,126,288
[45] Nov. 21, 1978

[54] PORTABLE ARTICLE DISPLAY ASSEMBLY

[75] Inventors: Frank A. De Sisto, Yonkers; Rosario D'Agrosa, Dobbs Ferry, both of N.Y.

[73] Assignee: J. C. Penney Co., Inc., New York, N.Y.

[21] Appl. No.: 808,342

[22] Filed: Jun. 20, 1977

[51] Int. Cl.² ........................................... F16M 11/20
[52] U.S. Cl. .................................. 248/188.1; 211/182; 248/165; 403/245
[58] Field of Search ....................... 211/182, 187, 206; 248/460, 150, 151, 165, 188, 188.1, 188.7, 188.8, 188.9; 403/230, 245, 246

[56] References Cited
U.S. PATENT DOCUMENTS

| | | | |
|---|---|---|---|
| 2,567,522 | 9/1951 | Moen | 211/182 X |
| 3,328,749 | 6/1967 | Kukla | 339/221 R |
| 3,356,327 | 12/1967 | Schreyer et al. | 248/188.8 X |
| 3,520,507 | 7/1970 | Strong | 248/188.8 |
| 3,553,871 | 1/1971 | Benchley | 248/165 X |
| 3,625,462 | 12/1971 | Jodan | 248/188.8 |
| 3,674,230 | 7/1972 | Propst | 248/188.8 |
| 3,711,133 | 1/1973 | Werner | 248/188.1 X |
| 3,863,769 | 2/1975 | Goddard | 211/182 |

FOREIGN PATENT DOCUMENTS 87,219 4/1956 Norway ................................ 248/188.8

*Primary Examiner*—Lawrence J. Staab
*Attorney, Agent, or Firm*—Pennie & Edmonds

[57] ABSTRACT

A portable article display assembly is contemplated which embodies a display frame having at least one hollow upright support member having sidewalls and at least an open bottom end portion. This display assembly comprises ground engaging means having a generally elongated, horizontal support member, at least one support leg attached adjacent each end of the horizontal support member, and retaining means being generally centrally connected to the horizontal member and being slidably insertable within the open end of the upright support for selectively, frictionally holding the ground engaging means in the upright support to thereby lock the latter in the former. Such retaining means includes a pair of vertical, spaced apart and generally parallel retaining members, each with a plurality of retaining ears projecting from opposing edges of the retaining members by a distance sufficient in magnitude for the retaining ears to frictionally engage the interior surfaces of the upright support member to thereby firmly lock the ground engaging means in the latter, in a fashion to provide a sturdy, releasable connection which also inhibits wobbling and rattling of the ground engaging means.

3 Claims, 6 Drawing Figures

PORTABLE ARTICLE DISPLAY ASSEMBLY

BACKGROUND OF THE INVENTION

1. Field of the Invention

The present invention generally pertains to display apparatus and, more specifically, to a simple and economical portable article display assembly for merchandise and the like which is easily assembled and disassembled.

2. Description of the Prior Art

The use of article display racks for a variety of article displaying purposes has become widely accepted in the merchandising field. Typically, since the display racks of the above category are often employed at a variety of locations, it is necessary to repeatedly disassemble, transport and reassemble these structures, in addition to, of course, storing the same. As believed self-evident, the foregoing procedures, especially whenever rather frequently performed, tend to be tedious and time-consuming activities.

The foregoing drawback is further compounded by the fact that the contemporary display structures have rather complicated constructions, particularly in terms of the interengaging joints between several of the connected components, which are relatively difficult to quickly and easily assemble and disassemble, such as by virtue of screws, bolts and the like. Often, hand tools are required to assist in the successful and complete assembling and disassembling of these types of known display racks.

Beyond the foregoing shortcomings generally associated with many presently available display rack constructions, there is the fact that they may have the tendency to rattle and wobble in the ordinary and customary usage thereof owing to the type of interegagement between the support legs of the display frame and the corresponding floor or ground engaging member.

Exemplarary of heretofore known approaches in this particular field are described in the following U.S. Pat. Nos. to Strong, 3,520,507; Jordan, 3,625,462; and Propst 3,674,230. The foregoing patents, in general, discuss approaches in which a ground engaging foot member is connected to an upright support column. The last-identified patent to Propst relates generally to a relatively complicated furniture construction divider which is rigidly secured to an upstanding post structure as by a plurality of screwthreaded members. The noted Jordan patent generally describes a furniture joint connection including a ground engaging member or foot in which the joint parts are push-fit together and bonded by a heat-treated resin adhesive. The first of the above-referenced patents illustrates a removable foot engaging portion which has a releasable connection between it and a vertical support leg of the display frame. Although the arrangement does not require screws or bolts and the like, there is nonetheless required a rather precisely formed structure to secure the desired interengagement, since tabs on the foot member must engage any one of a plurality of pressed-out slots in order to achieve a locking or detent action between the support leg and ground engaging foot member.

From the preceding remarks, it can be readily appreciated that the prior art is characterized by a variety of structures which are relatively complicated in design, relatively costly to construct, and which do not, in general, permit as quick and easy of an assembly and disassembly as might be desirable, as well as provide a sturdy structure which prevents against rattling and wobbling of the noted interengaging ground engaging member and the upright support of the display frame.

SUMMARY OF THE INVENTION

It is an object of the present invention to overcome several of the aforenoted deficiencies associated with heretofore known prior art article display assemblies by providing a novel and improved portable article display assembly which is sturdy as well as easily assembled and disassembled by virtue of a simple, positive, effective, economical and releasable interengagement between an upright column of the display support frame and a removable ground engaging means.

Broadly, in accordance with the principles of the present invention, there is provided a novel and improved portable article display assembly which comprises a display frame having at least one hollow display upright support leg and at least an open bottom end portion. Such display assembly has ground engaging means with a generally elongated horizontal member, at least one leg attached adjacent each end of the horizontal member, and retaining means being generally centrally connected to the horizontal member and being slidably insertable in the upright support for selectively frictionally holding the ground engaging means in the upright support to thereby lock the latter to the former. The noted retaining means includes a pair of vertical, spaced apart and generally parallel retaining members, each having a plurality of retaining ears projecting from opposing edges of each of the retaining uprights by a predetermined distance sufficient in magnitude for the retaining ears to frictionally engage the interior surfaces of the upright support member to thereby firmly lock the ground engaging means in the latter, in a fashion which provides a sturdy, releasable connection that also inhibits wobbling and rattling of the ground engaging means.

BRIEF DESCRIPTION OF THE DRAWINGS

The above and other objects, features and advantages of the present invention will become readily apparent upon reading a detailed description of a preferred embodiment made in accordance with the spirit and scope thereof when viewed in conjunction with the accompanying drawings, wherein like reference numerals indicate like structure throughout the several views.

DETAILED DESCRIPTION

Figure 1:
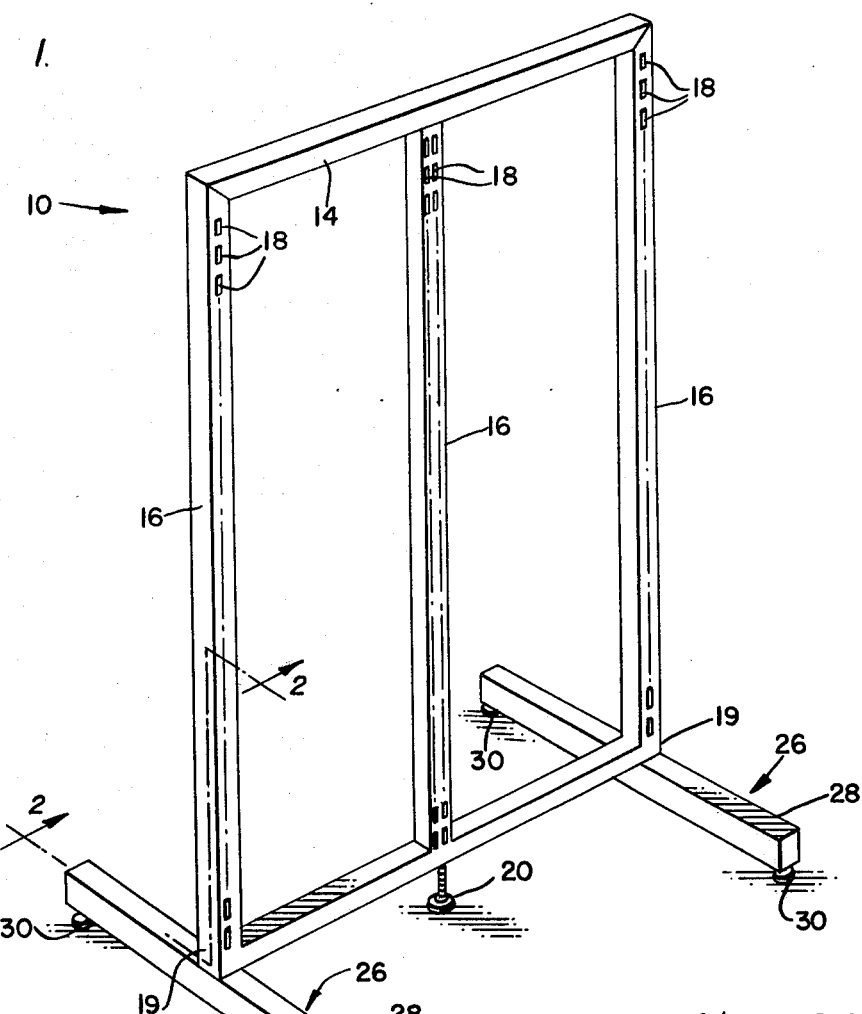
FIG. 1 is a perspective view illustrating a novel and improved article display assembly made in accordance with the principles of this invention.
Figure 4:
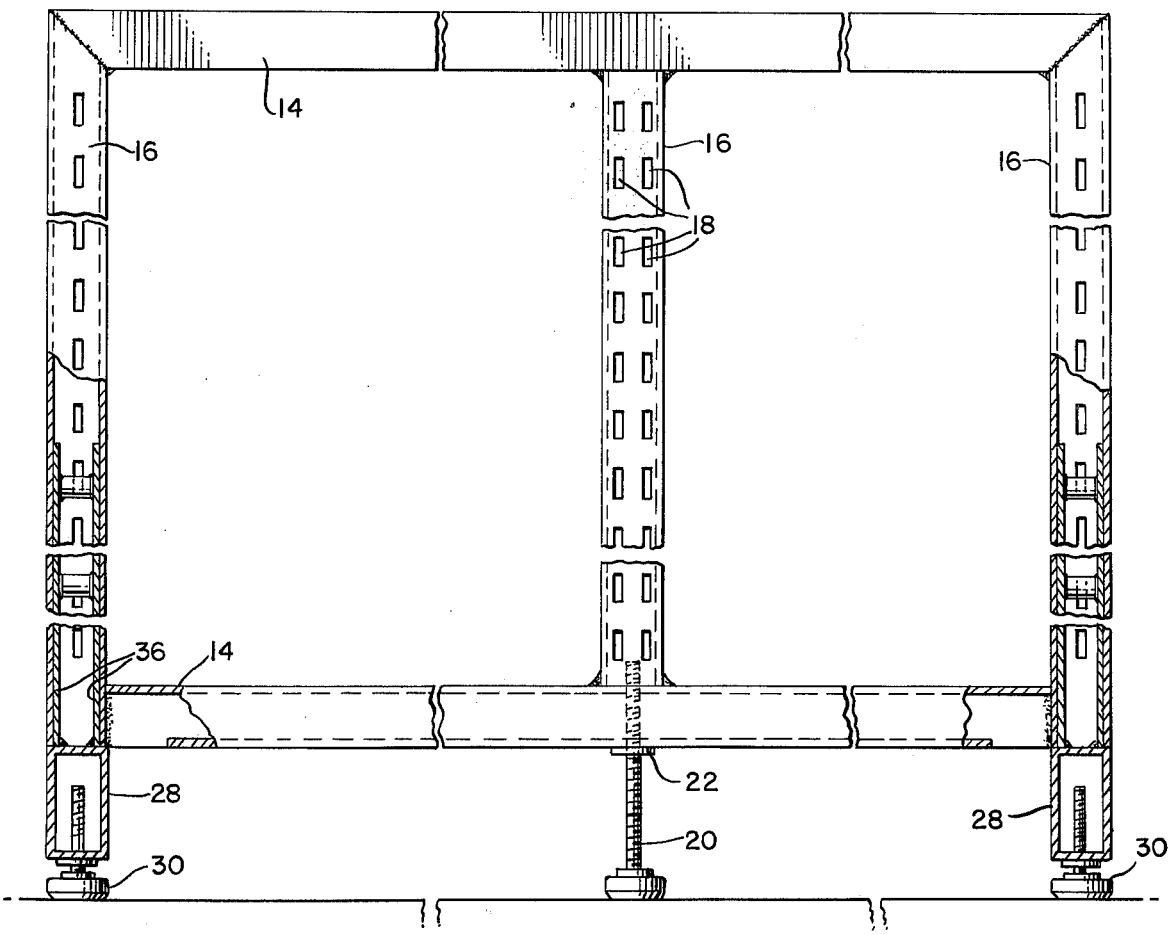
FIG. 4 is an elevational view, partly in section, illustrating in greater detail the components of this invention in an assembled or interlocked condition.

Referring now to the drawings and, in particular, to FIG. 1 taken in conjunction with FIG. 4, there is perhaps best illustrated the portable article display assembly of the present invention being generally designated by reference numeral 10.

Portable display assembly 10 includes a conventional type of display frame 12 which is comprised of a pair of spaced apart generally parallel horizontal hollow support members 14. A plurality of vertical hollow support columns 16 are suitably connected to and between the horizontal frame members 14, as by welding. The hollow support frame members defining both the vertical and horizontal supports 14 and 16 are made of any conventional type of material which is generally employed in this field so long as it provides sufficient strength, rigidity, as well as permits easy carrying thereof. An example of such material may be cold rolled steel. Plastic materials are, of course, also envisioned.

Each of the vertical support columns 16 are formed with a plurality of standard supporting slots 18. In the embodiment being illustrated, the center vertical column includes a pair of vertically arranged slots 18. Slots 18 are particularly adapted to cooperate with typical hook-type engaging members (not shown) which are detachably connected thereto for purposes of supporting articles to be displayed. The outermost pair of vertical support columns 16 have open bottom ends 19.

A central leveling foot 20 is disclosed as having an upper threaded portion which threadedly engages with welded nut 22 that is positioned on the bottom of lowermost horizontal supporting member 14. Such threaded portion of foot 20 cooperates in conventional fashion with the welded nut 22 to permit selective vertical adjustment of the portable article display assembly 10.

Figure 3:
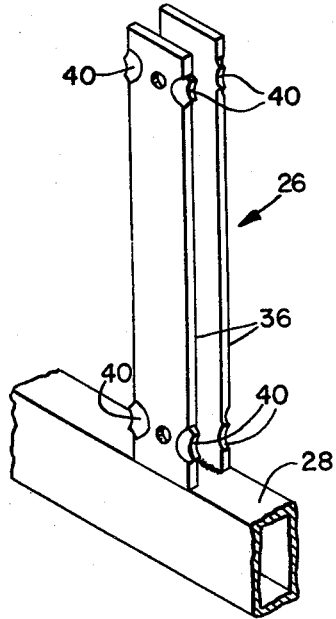
FIG. 3 is a perspective view illustrating a ground engaging means which embodies the principles of the present invention.
Figure 5:
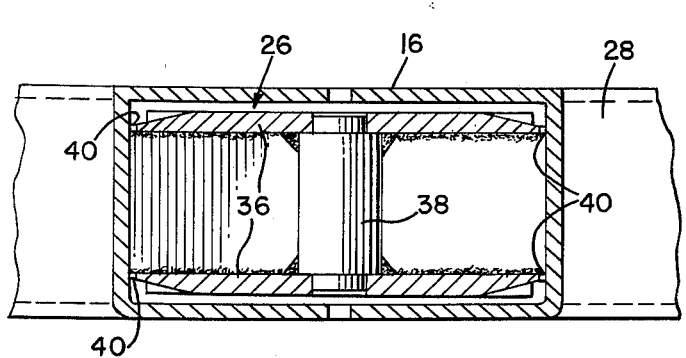
FIG. 5 is a view taken along section line 5-5 appearing in FIG. 2 looking substantially in the direction of the arrows and showing in detail an interlocking engagement between the upright support of the display frame and the ground engaging means.
Figure 6:
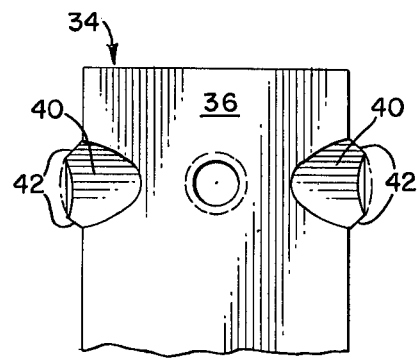
FIG. 6 represents an enlarged fragmented view depicting the retaining ears forming a part of the present invention.

Reference is now made to FIGS. 3 to 5 along with FIG. 1 wherein there is perhaps best perceived ground engaging means 26 of the present invention. Ground engaging means 26 or foot has a generally T-shape. In this particular embodiment, it is defined by a generally hollow horizontal foot support member 28 having closed ends. A pair of conventional leveling feet 30, similar in type and function to that earlier described, is threadedly connected to corresponding welded nuts 32 fastened to the bottom and at opposite ends of the horizontal foot support member 28. Likewise, leveling feet 30 enable selective vertical positioning of portable article display assembly 10. It is within the spirit and scope of the present invention that the ground engaging means 26 be firmly and slidably retained within the open bottom ends 19, much as in the manner depicted in FIGS. 1, 2, 4 and 5.

Generally, centrally positioned and vertically arranged with respect to horizontal foot support member 28 is the retaining means 34. Retaining means 34 may include a pair of vertical, generally parallel and spaced apart flat plate retaining members 36, which are suitably connected at their respective base portions to the horizontal supporting member 28. Retaining members 36 are generally spaced apart by a distance which is sufficient to be in close proximity to opposed interior sidewalls of vertical support columns 16, such as shown in FIG. 5. Alternatively, the side surfaces of retaining plate members 36 may slidably engage such opposed side surfaces. By either of the above arrangements, there will be less of a tendency for ground engaging means 26 and the display frame 12 to adversely wobble.

Moreover, the foregoing described arrangement enhances overall stability for display assembly 10. It will also be appreciated that by reason of the fact that there are only a pair of opposed retaining members 36, such arrangement is advantageously simple in construction, especially in comparison to many heretofore known display interengaging members. A pair of spacer rods 38 may be connected to and between the retaining plates 36.

In the embodiment being described, the retaining plate members 36 include a plurality of projections 40 or ears which extend laterally outwardly, such as depicted in FIGS. 2, 3, 5 and 6. Projecting retaining ears 40 extend from the lateral marginal edges of the retaining plate members 36 and are adapted to frictionally and non-yieldably engage the interior surfaces of upright support columns 16 in a fashion which permits the ground engaging means 26 to remain frictionally, yet releasably locked within the vertical columns 16.

In connection with projecting retaining ears 40, such are shown in the illustrated embodiment as being generally flat and formed with a pair of outwardly extending tips 42 which engage the interior surfaces of vertical column 16 to form a line contact between ground engaging means 26 and display frame 12. The retaining projections 40 may be suitably formed from the retaining plates 36 by appropriately stamping or pressing the longitudinal surfaces. This can be achieved by any suitable and conventional metal deforming device. The tips 42 may be formed by trimming the depressed retaining plate areas in a known manner not forming a part of the invention. Insofar as the retaining projections 40 are formed from the retaining plates 36, an extremely simple and inexpensive means is provided for achieving an interlocking engagement.

The present invention envisions that the retaining projections 40 can be formed by other appropriate members added along the marginal edges of the retaining members 36. The material for such projections 40 can be selected so as to be durable in use while providing sufficient frictional resistance to prevent undesired and uncontrolled removal of the ground engaging means 26 from within the vertical columns 16.

Figure 2:
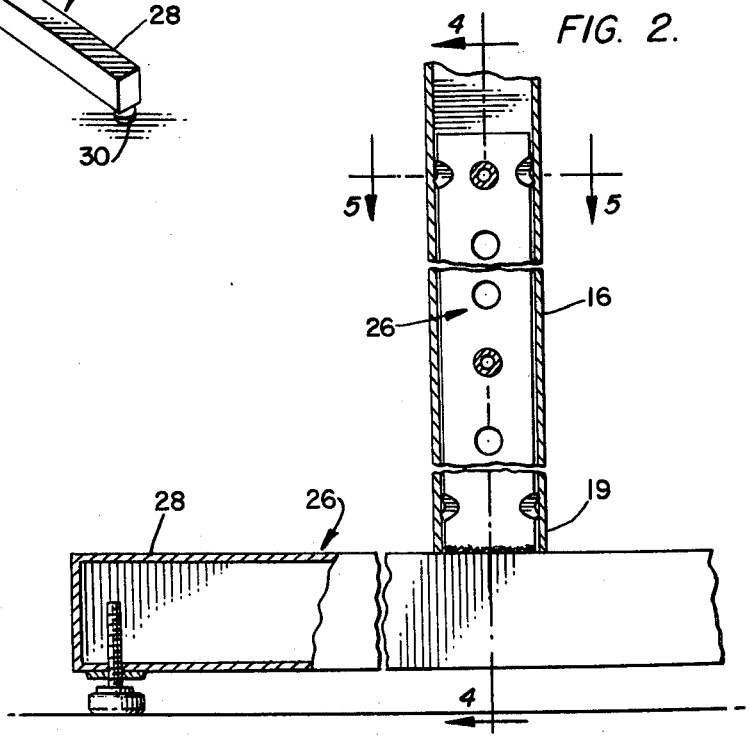
FIG. 2 represents an enlarged view taken along section line 2—2 appearing in FIG. 1 substantially looking in the direction of the arrows and illustrating certain details forming an aspect of this invention.

As best depicted in FIGS. 2 and 3, each of the retaining plate members 36 is formed with a pair of upper and lower projecting ears 40. As a consequence of the foregoing arrangement, there is less of a tendency for the ground engaging means 26 to wobble or rattle with respect to the upright vertical support columns 16.

The foregoing described arrangement provides for a simple, positive, effective and economical releasable type of interengagement between the display frame columns 16 and the removable ground engaging support means 26. As believed apparent, the portable article support and display assembly 10 may be assembled and disassembled in a quick and efficient manner without the necessity of using hand tools. Moreover, the foregoing construction is a much more simplified approach than heretofore known prior art approaches and results in a construction which is substantially trouble-free as well as sturdy in the normal usage thereof.

After having explained the above constructional arrangement of components for display apparatus 10, it is believed that the normal mode of assembling and disassembling of the present invention, as well as the manner of cooperation between the interengaging components is relatively self-evident. Although the construction and cooperation of one ground engaging means has been given in detail, it will be appreciated that the other is similarly constructed to function in a similar manner.

While the invention has been described in connection with the above preferred embodiment, it is not intended to limit the invention to the particular form set forth above, but, on the contrary, it is intended to cover such alternatives modifications, and equivalents as may be included within the spirit and scope of the invention as defined by the appended claims.

What is claimed is:

1. A portable article display assembly comprises display frame means defined at least by a pair of support members adapted to be mounted in spaced-apart, vertical orientation, each of said support members having a rectangular channel within at least its end length and a coextensive opening in the end communicating with said channel; and means for supporting said display means on a supporting surface, said supporting means including a pair of supporting members, and retaining means carried by and substantially centrally of each said supporting member, said retaining means including a pair of rectangular plate elements extending parallel to one another, perpendicular to said supporting member and spaced by a distance whereby the outer surfaces when said display frame means is received on said supporting means are closely juxtaposed to one pair of opposite internal walls of said channel, each said plate element in elevation having an elongated major dimension which is less than the length of said channel and a plurality of ears extending from opposite sides of each plate element to increase effectively its minor dimension, said display frame means received releasably on said supporting means by slidably inserting said retaining means into said channel whereby said ears on each said plate element both firmly and frictionally engage the other pair of opposite internal walls of said channel to militate against wobbling and/or rattling of said display assembly.

2. The display assembly of claim 1 wherin each plate element includes an upper and lower pair of extending ears, and said pairs of ears being disposed within the region of the ends of said plate elements.

3. The display assembly of claim 2 wherein said ears comprise generally flat areas having a pair of outwardly extending spaced tips.

* * * * *